Sept. 22, 1931.  G. REICHENBECHER  1,824,500
REENFORCED JOINT FOR SOCKET PIPES
Filed Dec. 21, 1928

Inventor:
Georg Reichenbecher
by
Attorney

Patented Sept. 22, 1931

1,824,500

UNITED STATES PATENT OFFICE

GEORG REICHENBECHER, OF MULHEIM-RUHR, GERMANY, ASSIGNOR TO THE FIRM VEREINIGTE STAHLWERKE AKTIENGESELLSCHAFT, OF DUSSELDORF, GERMANY

REENFORCED JOINT FOR SOCKET PIPES

Application filed December 21, 1928, Serial No. 327,618, and in Germany February 28, 1928.

The present invention relates to joints for socket pipes and has for its object to provide an improvement in reenforced joints for socket pipes.

Up to now the sockets of a pipe line, whether jointed by a lead packing or by welding, have been reenforced in various ways in order to reduce the strain to which the pipe joint is subjected in actual service. For this purpose smooth faced or otherwise suitably shaped sleeves were shrunk on the pipe end or reinforcing rings were rolled on in the course of the manufacture of the socket.

All these types of reinforcements, however, have the common disadvantage that the rolled or pressed sockets cannot always be manufactured to a degree of accuracy that insures perfect shrinking of the rings, and in consequence, the rings become easily loosened and in transit are often detached from their sockets, so that the said reinforcements to a considerable degree fail to give the desired result i. e. to reduce the strain on the pipe joints.

It is known that the pipe joints may be rendered sufficiently resistant to the strain to which they are subjected in actual service by folding the ends of the pipes back on the outer surface of the same so as to reinforce the said ends by doubling or tripling their original wall thickness, thus forming a reinforcement out of the material of the pipe itself.

It is the object of the present invention to provide a pipe joint that is characterized by the fact that the end of the pipe which has been formed into a socket by socket-like expansion and folding back to provide layers and double or triple wall thickness so as to have the socket as well as the reinforcement made integral whereby the above mentioned disadvantages are completely done away with.

Accordingly, the invention consists in a joint for socket pipes, sealed either with a gasket and lead joint or by welding, and in which either the socket or the inserted end of the pipe has its wall thickness increased to about three times its original gauge by having been folded back several times. In carrying out the invention the shape of the socket as well as the way of manufacturing it may be chosen at will and the reinforcement may be of any suitable length and may extend either over the front end of the socket only or over the whole length of the socket right to the neck of the latter, according to circumstances.

In order that the invention may be better understood various modes of carrying the invention into effect have been illustrated in the accompanying drawings, wherein.

Figure 1:
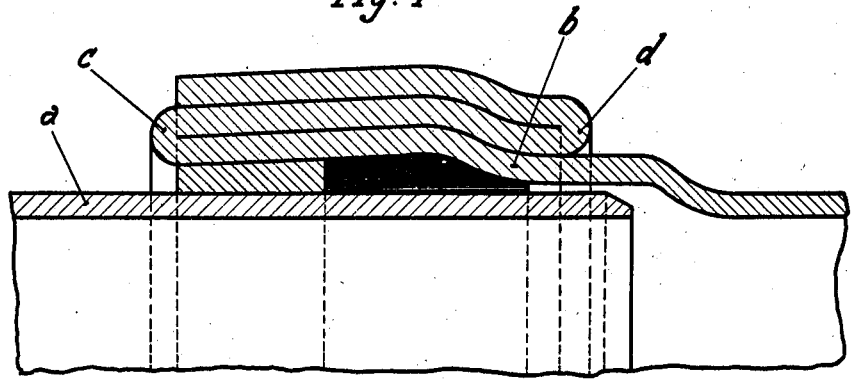
Fig. 1 is a partial longitudinal section of a reenforced pipe joint packed with a gasket and lead.
Figure 2:
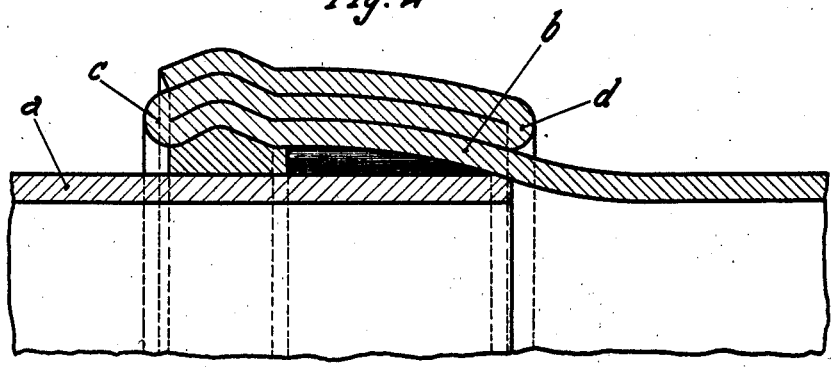
Fig. 2 is a partial longitudinal section of a modification of the improved reenforced pipe joint.

Referring more particularly to Figs. 1 and 2 two differently shaped socket joints, sealed by a suitable lead packing, are illustrated and $a$ designates the end of the pipe that has been inserted into the socket $b$. The socket $b$ has been folded back several times, as at $c$ and $d$, and, in consequence of this folding operation, has been reenforced over its entire length to three times its original wall thickness.

Having thus described my invention what I desire to secure by Letters Patent is:

1. A reenforced joint for socket pipes sealed by a gasket and lead packing having the end of the exterior pipe wall folded back upon itself several times and increased in diameter so as to form a reenforced socket consisting of a plurality of circumferential layers over the entire depth of the socket joint.

2. A reenforced joint for socket pipes sealed by a gasket and lead packing having the end of the exterior pipe wall folded twice back upon itself and increased in diameter so as to form a reenforced socket consisting of three circumferential layers over the entire depth of the socket joint.

In testimony whereof I affix my signature.

GEORG REICHENBECHER.